US007035758B1

(12) United States Patent
Jerome

(10) Patent No.: US 7,035,758 B1
(45) Date of Patent: Apr. 25, 2006

(54) INSPECTION SYSTEM AND METHOD OF INSPECTION UTILIZING DATA ACQUISITION AND SPATIAL CORRELATION

(76) Inventor: George Jerome, 9565 Vassar Ave., Chatsworth, CA (US) 91311

( * ) Notice: Subject to any disclaimer, the term of this patent is extended or adjusted under 35 U.S.C. 154(b) by 441 days.

(21) Appl. No.: 10/465,463

(22) Filed: Jun. 19, 2003

(51) Int. Cl.
*G06F 19/00* (2006.01)

(52) U.S. Cl. ....................................... 702/150; 702/189

(58) Field of Classification Search ................ 702/150, 702/189, 151, 188
See application file for complete search history.

(56) References Cited

U.S. PATENT DOCUMENTS

| | | | | |
|---|---|---|---|---|
| 6,876,202 | B1 * | 4/2005 | Morrison et al. | 324/330 |
| 2005/0014499 | A1 * | 1/2005 | Knoblach et al. | 455/431 |

* cited by examiner

*Primary Examiner*—Edward Raymond

(57) ABSTRACT

A method and apparatus for inspecting the outer surfaces of a building, structure, or vessel without placing at risk either people or large mechanical structures, or people and property at or near the base of the building, structure and vessel. The inspection is accomplished through the raising and lowering of a self-propelled, stabilized platform in proximity to the vertical exterior of the building, structure, or vessel, and recording, by video, digital, infrared and other means, the condition of the wall and correlating the position of the platform with actual locations on the exterior of the building. By eliminating the use of large mechanical devices, and people, suspended over the side of a building, structure and vessel, the inherent risks of such efforts are essentially eliminated.

39 Claims, 9 Drawing Sheets

INSPECTION SYSTEM AND METHOD OF INSPECTION UTILIZING DATA ACQUISITION AND SPATIAL CORRELATION

FEDERALLY SPONSORED RESEARCH

None

SEQUENCE LISTING OR PROGRAM

None

BACKGROUND

1. Field of the Invention

This invention relates to inspection of buildings, vessels, and structures, particularly to the inspection of exposed exterior components.

2. Description of the Prior Art

Buildings, vessels and structures require periodic inspection of their exposed surfaces at elevated heights for many purposes, including legal transactions, maintenance, regulatory inspections, meteorological events, energy conservation, structural integrity, breach of the surface, failure of components, moisture penetration, and conditions that can lead to moisture penetration or failure.

The methods used for these inspections generally fall into four categories;

a) The use of manned mechanically operated ground-based, cranes, derricks, and lifts.

b) The use of manned mechanically operated roof deck level cranes and lifts.

c) The use of manned window-washing platforms or other suspended platforms (stages) lowered over the side of the building, structure, or vessel.

d) The use of ground-based scaffolding.

Typically land-based, manned, mechanically operated lifts are limited to heights of about 20 meters or less. Their smaller footprint and mobility account for most observations at these heights. Land, roof, or deck based, cranes, derricks, and the like are useful at greater heights, but due to their footprint, mobility, and regulatory requirements, they have limited acceptance in densely populated areas, or are limited due to physical space restrictions. E.g., in Manhattan, it may not be feasible or practical to move such equipment into position, thereby rendering it unsuitable and unusable. The installation and operation of this type of equipment requires compliance with federal safety standards as well as local permitting and inspection. Due to insurance and regulatory requirements, the tedious nature of the operation, and the necessary manual recording of observations, this type equipment can make the cost of inspections prohibitively expensive.

Window-washing or other suspended platforms (stages) can be used on most types and heights of buildings. In the event of equipment failure, high winds, or other unusual circumstances, such equipment can be dangerous, and has caused the death of numerous people and damage to property. Some regulatory requirements and/or local ordinances may limit the suspension of people over the sides of buildings due in part to conditions leading to past accidents. The installation and operation of this type of suspension equipment requires compliance with federal safety standards [OSHA] as well as local permitting and inspection. Due to insurance and regulatory requirements, the tedious nature of the operation, and the necessary manual recording of observations, the cost of the technique can also become prohibitively expensive.

Scaffolding, while generally an acceptable means of close inspection of the exterior components, is restricted to ground-based structures. It is not applicable to vessels or buildings and structures in which temporary ground-based erection is not feasible or practical. E.g., a bridge over water or roadway cannot be inspected by a scaffold. Moreover, for buildings or structures of considerable height, the problems of erecting such a structure can become considerable, as well as an increasingly risky endeavor. For reasons similar to that of the previously described window-washing type equipment, scaffolding systems are often precluded due to high cost and prohibitive local and federal regulations. Additionally, the transport of the required materials, the securing of the area under the scaffold construction, and the cost of removal of the scaffold can make the operation prohibitively expensive. The installation and operation of this type of equipment requires compliance with federal safety standards as well as local permitting and inspection.

By whatever means used, present techniques are not as cost-effective, safe, and accurate as possible for inspections and the archiving of inspection data. Current approaches to the problem place people over the side of a building, in a potentially precarious situation. There they must record, by various means available such as photography, what they see. Being suspended over the side of a building, possibly as much as 250 meters above the ground, the workers must then somehow relate their position to a specific location on the building. Engineers, building-maintenance professionals, and others interested in the condition of their building often will refuse to take the risks inherent in this type of operation. The actual inspection is left to people who see and report what they see to those making maintenance decisions. Any precise correlation between pictures taken and the actual location on the building which the pictures represent is thus lost.

The present options, based upon current technology, leave no satisfactory alternatives for close vertical observation of a building, a structure, or a vessel's visible components that is safe, cost effective, and useable on all sizes and shapes of buildings, structures and vessels.

It is insufficient to simply hang a camera over the side of a building. Such a device would be a pendulum that would swing wildly with the slightest breeze. A cable, even a few feet in length, would exhibit an irresistible tendency to twist, making accurate recording of a specific position of wall impossible. Even if the gyrations of such a pendulum were controlled, to be of value it still requires a means of correlating the position of the camera and the viewing sight line of the camera with the pictures taken.

Because of the expense, feasibility and practical application, close inspection of buildings, structures or vessels have generally not been done for the purpose of due diligence at time of sale, lease, or insurance issuance/coverage of the building, structure or vessel. This has led to numerous surprises, claims of hidden defects, insurance claims, adjustment to purchase price and other claims/litigation that could be averted, deemed unwarranted or otherwise prevented through the use of the present invention.

Previously, due to costs, feasibility and practical application, buildings, structures and vessels have received only cursory inspections unless an overt problem dictated a failure or significant variance in performance. Typical problems would be a leaking window, a falling piece of debris, or indication of a structural failure necessitating a mandatory close inspection of a building structure or vessel.

With conventional equipment, it would be tedious at best to create an accurate, section by section record of the condition of exterior visible components. Workers, operating from conventional equipment would have a difficult time of not only recording surface conditions, but tracking the exact location of each photograph or video frame.

The prior art is replete with teachings of means and methods of suspending persons and equipment over the sides of buildings, structures, and vessels for purposes of inspection, cleaning, repair or modification of the referenced items. One area of prior art, starting as early as 1887 with U.S. Pat. No. 359,902, to U.S. Pat. No. 6,547,205, teaches a plethora of means to achieve a "bird's eye view" of a large object. Some of the prior-art teachings result in distant views, while those offering a close-up view require manned operations. Generally, those offering a distant view of an object, even with the use of long-distance lenses, result in oblique views that can distort what must be seen to properly inspect the condition of a building. Still other devices achieve aerial views using lifting devices and platform stabilization. None of the prior art devices achieve vertical viewing without on-the-spot human intervention and precise ground references to correlate the data gathered with an exact location being viewed.

Fisher, in U.S. Pat. No. 4,096,922 (Jun. 27, 1978), provides a fixed roof structure that serves to support two or more cables connected to a suspended stage. The fixed structure includes support beams extending beyond the line of the roof, enabling the cables that support the vertically adjustable stage to be suspended from such beams. Fisher's structure is large, expensive to install, and generally requires permits issued by the local building and safety department. Fisher's stage can be used for purposes such as window washing, wall repair, as well as inspection of the structure. In the event of a failure of one or more cables, the stage, and everything located on it can fall to the ground, possibly causing fatal injuries to both workers and pedestrians. Some cities have limited the use of devices such as this, due to accidents leading to death.

Beeche, in U.S. Pat. No. 4,234,055 (Nov. 18, 1980), teaches a more complex device than Fisher, combining the roof suspension capabilities of Fisher with a scaffold. As with Fisher, Beeche's scaffold-stage can be used for work on the structure, as well as inspection. Since the scaffold does not necessarily reach to the ground, and in fact is raised and lowered by a mechanism similar to Fisher's, the possibility of a failure of a cable can lead to the same catastrophic results of a failure of the Fisher stage.

Anderson, in U.S. Pat. No. 4,270,628 (Jun. 2, 1981), teaches another type of elevator support device for raising and lowering a stage, or cage, over the side of a building. If the task is actual repair of a building, such a device can be of great use. However, if the task is to inspect a building, the device involves considerable expense in setup, permitting, inspection, and use. Then there is the possibility of a failure as has occurred several times, leading to injury and property damage.

Powell, in U.S. Pat. No. 4,296,905 (Oct. 27, 1981), teaches an adaptation of previous structures that allows overhangs of buildings. Previous structures are generally presumed to have a straight drop from the roof edge down the side of the building. Powell's device requires inspection of a building's exterior wall by bringing a person, or persons, within proximity to the wall.

Fisher, in U.S. Pat. No. 4,496,027 (Jan. 29, 1985), revisited his prior stage, this time providing a cantilevered structure to improve mobility. As with his previous stage, Fisher did not envision any means of building inspection without placing people in proximity to the building wall to be inspected. Actually, Fisher's stage increases the possibility of failure. If the stage is overloaded with too much weight, i.e. too many people, his cantilevered structure could tip forward, leading to the entire structure falling over the side of the building.

Altman, in U.S. Pat. No. 4,647,422 (Mar. 3, 1987), envisions a need to inspect structures, specifically addressing the inspection of nuclear reactor containment housings. Altman limits his device to specific structures, and he does not envision an all-inclusive means of inspecting the outer surface of surfaces of random shape.

Finley, in U.S. Pat. No. 5,065,838 (Nov. 19, 1991), recognizes the existence of parapet around the roof perimeter of some buildings. He teaches a means of securing a structure to the parapet, the structure then supporting a stage, or scaffold, similar to other devices. While Finley's device may be used for inspection purposes, it is primarily intended for the support of window-washing equipment and the like. Failure would also subject workmen and pedestrian to potential injury.

Woodyard, in U.S. Pat. No. 5,287,944 (Feb. 22, 1994), recognizes, possibly more than any previous patents, the dangers and risks associated with suspending men and equipment over the side of a building. Woodyard teaches a fall restraint and/or fall arrest system. He teaches a preferably permanently installed anchor. Presumably, the Woodyard device can be used as a safety backup in the event primary cables fail. Although seeing the inherent danger of working on a building, Woodyard fails to envision a means of eliminating nearly all of the structure necessary to put men over the side of a building for purposes of inspecting that building.

Baziuk, in U.S. Pat. No. 5,341,898 (Aug. 30, 1994), teaches a foldable boom as a means of supporting a suspended scaffold;

Goto, in U.S. Pat. No. 5,343,979 (Sep. 6, 1994), teaches multiple power winches for lowering and raising a gondola down the side wall of a building;

Cohen, in U.S. Pat. No. 5,713,430 (Feb. 3, 1998), teaches a horizontal beam, raised and lowered along a wall, for treating the exterior walls of a building;

D'Amaddio, in U.S. Pat. No. 6,317,387 (Nov. 13, 2001), describes a remote controlled device, using acoustical sensors to provide positioning information, to place the remote controlled device in a desired position with respect to a ship's hull. D'Amaddio concentrates on the problem of inspecting a ship's hull, and does not envision the need to also closely inspect above-water-line structures.

Another area of prior art encompasses the stabilization of cameras. An example is shown in Carter et al, in U.S. Pat. No. 6,547,205 (Apr. 15, 2003). Carter describes a platform supporting a payload wherein the platform is stabilized against undesired displacement induced by a vehicle's motion. Using gimbals and gyroscopes, Carter protects his payload from shock and vibration. As with numerous other prior devices, Carter relies on "isolation means" to block shock and vibration from reaching his payload. While Carter anticipates these forces which might affect his payload, he fails to consider a force that actually displaces his payload from a desired location, and any means of returning the payload to its appointed location.

Likewise, Lewis, in U.S. Pat. No. 6,263,160 (Jul. 17, 2001), teaches a stabilized platform for payloads. As with Carter, Lewis seeks to isolate a payload from a shock and vibration source, such as a vehicle. Neither Carter nor Lewis anticipates a need not only to detect an external force on a payload, but a means of counteracting that force to maintain a fixed position in space for the payload. Carter and Lewis are generally concerned with stabilizing a camera so as to provide a steady, clear picture without the effects of vibration, jitter, or tilting. They presume that the "vehicle"—which could include a person holding a camera—will provide the means to correct for displacement of the camera.

Other prior art includes devices and methods to stabilize, or position advantageously a camera or data recording device. Examples include the following;

Steffens, in U.S. Pat. No. 359,902 (Mar. 22, 1887), envisions a camera, elevated by a lifting device (a balloon), and an electrically operated shutter. With Steffens, the art is advanced to permit birds-eye-views of Earth-bound objects. However, Steffens does not envision the accumulation of data from a new vantage point, much less juxtaposing that data with coordinates identifying the exact location on an object of that data.

Another early designer, Fairman, in U.S. Pat. No. 367,610 (Aug. 2, 1887), begins to understand the problems associated with an elevated camera. He describes the difficulties of maintaining position control, and suggests the use of multiple guy wires to stabilize his elevated camera platform. While this may work in limited situations, it cannot provide stabilization under windy or gusty conditions.

Adams, in U.S. Pat. No. 510,759 (Dec. 12, 1893), ingeniously couples a barometric pressure altimeter and a parachute to take a picture at a specified altitude, and then return the camera to Earth relatively safely. These early designers did not have the vision, nor the tools, to take a birds-eye-picture, much less relate that photo to a specific location on an object.

Leavitt et al, in U.S. Pat. No. 3,638,502 (Feb. 1, 1972), teaches a camera stabilization system utilizing a plurality of gyroscopes. While Leavitt achieves his goal, the stabilization of a platform from random movements of the supportive vehicle—he uses heavy, complex mechanical devices, and does not address the issue of positional information relative to the pictures taken by his stabilized camera.

Watson, in U.S. Pat. No. 5,034,759 (Jul. 23, 1991), teaches a similar device to that of Leavitt; a stabilized platform for the purpose of obtaining good quality photographs. Watson, as with Leavitt, envisions a complex mechanical device to achieve stability without having the ability to move, in a desired regimen, in three-dimensional space and coordinate that position in that space with the photos, or data, obtained.

The art advances with Desselle, in U.S. Pat. No. 5,752,088 (May 12, 1998). Using a blimp as a lifting means, Desselle teaches a means to lift a camera, a means to stabilize the camera, using mechanical devices, and a means to position the camera by means of a remote operator. As with all other art, Desselle does not consider the taking of a photograph or data capture during those times when the platform is in a desired position, and the recordation of that position with the data accumulated.

Most prior art dealing with camera stabilization utilizes gyroscopic methods to hold a platform parallel with the Earth's horizon. While such techniques work to maintain a level surface, they do nothing to ensure the actual location of the platform. To maintain a correlation between data and spatial location, other methods are required.

While the prior art contains many other devices relating to the positioning of a camera relative to a desired target, all that I have found provide an unstable platform, which cannot simultaneously maintain a precise spatial location, while providing coordinates of that location correlated with the data captured at that specific location. Nor has the prior art addressed the problems associated with the close-up inspection of the vertical sides of a tall building, structure or vessel without putting persons or heavy equipment in harm's way.

Insofar as I am aware, heretofore there has not been any way to inspect a vertical component of a building, structure or vessel, through close-up viewing and data capturing, while negating the effects of random movement of the data-capture device, and for the data captured, correlating the data with specific coordinates of the location on the target. Moreover, this must be done without risking people, large equipment, nearby structures or objects, or people and objects directly underneath the viewing operation.

OBJECTS AND ADVANTAGES

Accordingly, one object of the present invention is to provide an improved means for close visual inspection of the vertical surfaces of any building, structure, or vessel and correlating the data derived with the actual position on the subject building, structure, or vessel. Other objects are to provide such a means without the necessity of placing humans, or large equipment or machinery in a suspended state over the side of the building, structure, or vessel, and to provide a means to closely electronically monitor/inspect vertical exterior surfaces, cladding, components and/or exposed structural components of structures, buildings and vessels for the purpose of examination for compliance with construction documents, quality assurance inspections, archiving, legal transactions, litigation, damage, wear, water leakage, degradation, insurance, energy efficiency, environmental and structural conditions.

Another object is to coordinate positional information with the visual inspection data, thereby relating an exact position of a building, structure, or vessel to the data gathered for that position.

Still another object is to provide a means to closely inspect building, structure, and vessel components, such as curtain walls, and window structures comprising the vertical sides for damage, wear, and structural problems without incurring the risk of large equipment or person suspended over a building.

Another object is to use data and imagery devices such as still cameras, video camera, digital cameras, infrared cameras, heat sensing devices, and other measurement devices to gather data on a subject building, structure, or vessel.

Additional objects are as follows:

To provide an apparatus which can sense the attitude of a data-gathering device for building inspections in three axes, pitch, roll, and yaw;

To compute the actual location of a data-gathering device by measuring the deviation from a desired position from sensor inputs;

To return a data-gathering device to a desired location by directing thrust sources to correct for computed positional deviations;

To provide a stabilized platform for a data-gathering device, utilizing positional sensors, and thrust sources;

To sense the velocity and acceleration of a supporting cable to obtain a smooth, continuous platform movement, correlated to the position of a data-gathering device, down the side of a building;

To provide positioning of a data-gathering device while preventing contact with a vertical surface of a building, structure or vessel;

To automatically pause a data-gathering device operation when spatial location is incorrect;

To resume inspection when data-gathering device returns to an acceptable spatial location;

To provide lightweight components so system cannot damage a horizontal surface or cause structural overloading during positioning or data-gathering device operations;

To provide safety sensors to insure against unauthorized or unsafe operation of the data-gathering device or associated equipment;

To provide a stabilized, vertically adjustable platform for observation and data-gathering of vertical exterior surfaces using infrared equipment;

To prevent unintended contact between a data-gathering device and building surfaces using a obstruction detector;

To provide an environmentally sound system—uses no petroleum based, or fluorocarbon based propellants;

To provide remote access to the data gathered by a data-gathering device;

To prevent wall damage through contact between data-gathering device and a wall through use of safety strut foam filled balls;

To provide remote, real-time viewing of structure/building/vessel surfaces without human on-site intervention;

To provide a photo archive or real-time reviewing option for viewing during hazardous conditions from weather related, environmental, chemical, etc events that would be hazardous to a manned operation.

The present system anticipates all of the problems associated with using an extremely long pendulum, and yielding a series of pictures or data points that can be accurately related to specific positions on the subject building.

The present system provides a reasonable means of close inspection without the expense or risk currently offered by the art.

Still further objects and advantages will become apparent from the following description of the invention.

SUMMARY

This invention is a system and method of suspending a platform over the side of a building, structure, or vessel, and stabilizing the platform for purposes of permitting photographs, video recordings, and other sensor readings to be made of sections of such vertical sides. The platform is stabilized in three axes; pitch, roll, and yaw. Lowering and raising the platform on a cable can be done at a controlled rate. While doing this, a series of recordings can be made of an entire vertical section of the designated surface. By synchronizing the cable movement, and the position of the supporting cart with recordings, the exact position of each recording with respect to a specific position on the building, structure, or vessel can be established. While a measurement of the vertical displacement of the cable provides one axis of location measurement, a horizontal movement sensor on the cart provides a second displacement axis. This data is then recorded with the inspection data to provide inspection data correlated with structure position data.

Sensors on the platform sense each of three axes and send position data to a processor that determines the spatial position of the platform, and corrects any position deviations by means of two or more thrust generators. If no position deviations are detected, then a recording can be made of the section of the vertical surface adjacent to the platform and the platform lowered to the next desired recording position.

As the platform is lowered down a building, structure, or vessel side, any movement of the platform outside of its intended attitude will cause the recordings to stop, and the cable movement to stop until the platform is back within its desired position. In this way, a displacement of the platform due to air currents, or other external forces, will disrupt the recordation of a series of views of a vertical strip of the subject vertical portion of a building, structure or vessel, commonly referred to as the "wall, side or hull" until such time as the platform is in the correct location for continuation of the desired recordation.

One primary benefit of the present system is that, while achieving close-up inspection data coordinated with positional data relative to the position on the target, minimal equipment is placed over the side of the building, with no human presence needed where such person or persons would be at risk to fall or be harmed.

DRAWINGS—FIGURES

Figure 1:
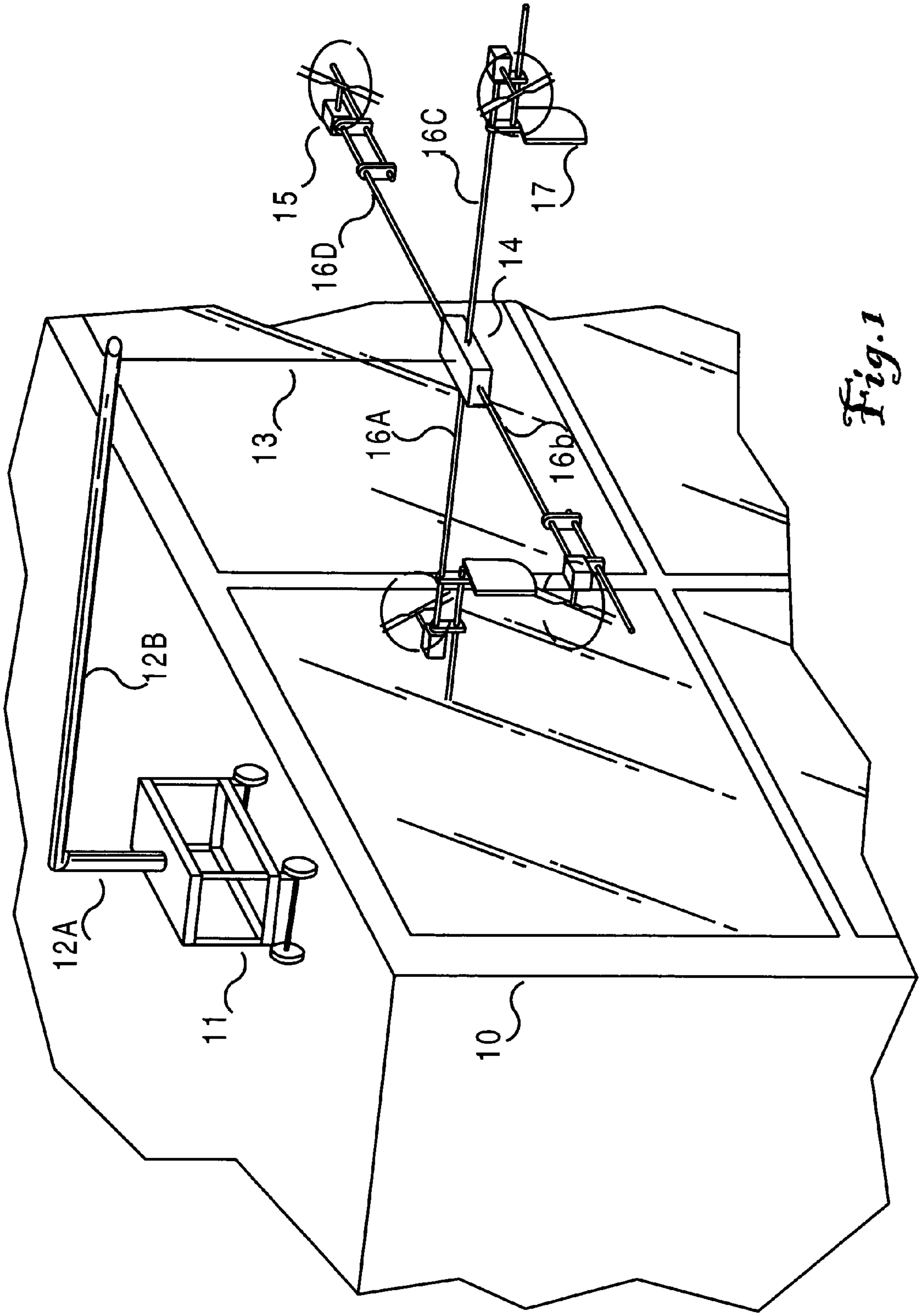
FIG. 1 is a perspective view of a building, and a vertical platform stabilization system according to the invention.

| REFERENCE NUMERALS |
|---|
| 10 Building, Structure, Or Vessel |
| 11 Cart |
| 12 Support Structure |
| 13 Cable |
| 14 Platform |
| 15 Thrust Generator |
| 16 Thrust Beam |
| 17 Rudder |
| 18 Bumper Beam |
| 19 Servo |
| 20 Direction Converter |
| 21 Pitch Shaft |
| 22 Pitch Control |
| 23 Blade Holder |
| 24 Blades |
| 25 Support |
| 26 Bumper |
| 27 Motor |
| 28 Thrust Shaft |
| 29 Joy Stick Controls |
| 30 Control System |
| 31 Cable Control |
| 32 Safety Support Tie Point |
| 33 Ballast |
| 34 Battery |
| 35 Data And Image Capture Device |
| 36 Support Wires |

-continued

| REFERENCE NUMERALS |
|---|
| 37 Structure Joint |
| 38 Cable Pulleys |
| 39 View Screen |
| 40 Wheels |
| 41 Operator |
| 42 Occupants |
| 43 Linear Measurement Device |
| 44 Horizontal Displacement Sensor |
| 45 Angle of Rotation |
| 46 Horizontal Displacement |
| 47 Vertical Displacement |
| 48 Obstacle Detecting Sensor |
| 50 System Initialization |
| 51 Yaw Calibration |
| 52 Operator Input |
| 53 Loop |
| 54 Decision |
| 55 Recalibrate Yaw |
| 56 Read Pitch Sensor |
| 58 Read Roll Sensor |
| 59 Read Yaw Sensor |
| 60 Thrust Required |
| 61 Set Blade Angle-Of-Attack |
| 62 Operate Motors |
| 63 Rotating Table |
| 64 Table Drive Motor |
| 65 Data Transmitter |
| 66 Transmitter Antenna |
| 67 Data Receiver |
| 68 Receiver Antenna |
| 69 Vertical Image Boundary |
| 70 Horizontal Image Boundary |
| 71 Vertical Image Section |
| 72 Image Area |
| 73 Inner Cable Component |
| 74 Cable Insulator |
| 75 Outer Cable Component |
| 76 Cable Jacket |
| 77 Distance Measuring Device |
| 78 |
| 79 |
| 80 |

DETAILED DESCRIPTION

FIG. 1—Perspective View of Building and Vertical Platform Stabilization System A building 10 (FIG. 1) represents any residential, commercial, industrial, or business building, structure, or vessel containing at least one horizontal surface. A wheeled cart 11 is positioned on the roof, providing support for the system components, including support structure 12. Cart 11 is suitably weighted so that it will support the other components without tipping. A vertical support arm 12A, and extending out from leg 12A, a horizontal support arm 12B is connected to cart 11. Vertical support arm 12A may be in sections, connected by structure joint 37. Horizontal support arm 12B may also be in sections, connected by structure joint 37.

A cable 13 extends down from the end of arm 12B, distal from arm 12A. A platform 14 is connected to the lower end of cable 13. Four thrust beams 16A, 16B, 16C, and 16D are connected to, and extend out from, platform 14. Thrust beams such as 16A are generally one meter in length. Four thrust generators, such as thrust generator 15, are connected to the outer ends of thrust beams 16A to 16D respectively. The thrust generators are more fully described in FIG. 2. Connected to thrust generators 15 are four respective rudders such as rudder 17.

FIG. 1—Perspective View of Building and Vertical Platform Stabilization System—Operation The system of FIG. 1 uses the horizontal, flat surface—generally but not limited to the roof or mezzanine—to support cart 11. Cart 11 is constructed with wheels or other means of assisting in mobility, so cart 11 can readily be moved around the roof or any floor of building. 10.

Arm 12B, on the upper end of arm 12A, projects out from cart 11 sufficiently so cable 13 can extend in a downward direction without contact with building 10. I.E., no part of platform 14, thrust beams 16A through 16D, or thrust generators 15 can contact building 10. The gap between the end of the closest thrust generators 15 and building 10 must be sufficient to allow for movement in all directions of platform 14 due to external forces, such as wind gusts, without permitting contact with building 10. This distance will vary with wind, height, and weather conditions, but should be from 2 m to 5 m. Rudders 17 assist in directing platform 14 into any prevailing wind.

Figure 2:
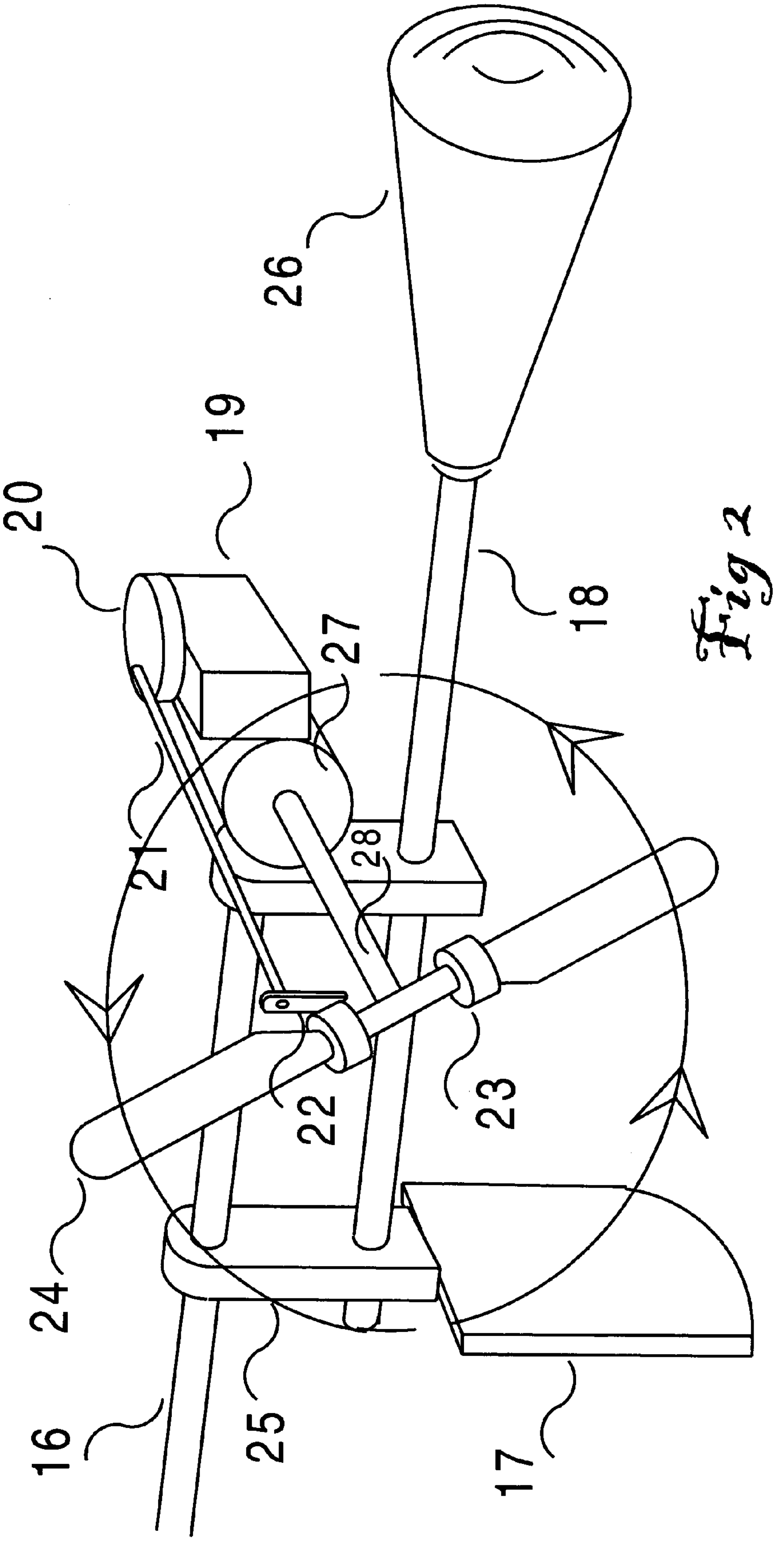
FIG. 2 is a perspective of a preferred thrust system used in the system of FIG. 1.

FIG. 2—Perspective of a Preferred Thrust System Used in the System—Detailed Description FIG. 2 generally depicts a preferred embodiment of thrust generator 15 of FIG. 1. Each thrust generator 15 encompasses thrust beam 16, rudder 17, a bumper beam 18, a servo 19, a rotation-to-linear converter 20, a motor 27, a thrust shaft 28, a pitch shaft 21, a pitch control 22, a blade holder 23, blades 24, support 25, and bumper 26. Thrust beam 16 is a support member connecting thrust generator 15 to platform 14. Blades 24, and blade holder 23, connected to motor 27 through thrust shaft 28, create thrust by transferring power from motor 27 to the air. The angle-of-attack of blades 24, relative to a plane defined by the arc of the rotation of blades 24, is changed by movement of blade holder 23 relative to the axis of motor 27. Servo 19 provides rotary motion to rotation-to-linear converter 20. Pitch shaft 21, connected to a point on the circumference of rotation-to-linear converter 20, moves in a near-linear fashion with respect to blades 24 and blade holder 23. The near-linear motion of pitch shaft 21 converted back to rotary motion by pitch control 22, thereby altering the angle-of-attack of blades 24.

FIG. 2—Perspective of a Preferred Thrust System Used in the System—Operation Thrust generator 15 provides force to correct the position of platform 14 as required to maintain a specific position of platform 14. At its outer end, each thrust beam 16 holds support 25. Support 25 (more than one support can be used) holds thrust beam 16, bumper beam 18, and motor 27. Motor 27 provides rotational force, directed through thrust shaft 28, to blade holders 23. When directed to do so, motor 27 causes thrust shaft 28, blade holders 23, and blades 24 to rotate. Blades 24 push the air in a direction dependent upon the angle-of-attack set by blade holders 23, providing thrust as a reaction force. The thrust generated is dependent upon both the pitch and the speed of blades 24.

Servo 19, when directed to do so, causes converter 20 to rotate in any specified direction. As direction converter 20 moves, it causes pitch control shaft 21 to move in a linear direction, with respect to servo 19, forward or rearward. Pitch control shaft 21 operates pitch control 22, which in turn controls the angle of blade holders 23. This lateral movement of pitch control shaft 21 causes blade holders 23 to change the pitch of blades 24, thereby altering the angle of attack of blades 24. The angle of attack of blades 24, whether positive or negative, determines the amount of force transferred from blades 24 to the surrounding air.

Bumper beam 18, held by supports 25, holds bumper 26 away from the rest of thrust generator 15. As platform 14 moves in response to wind movements, thrust generator 15 may not have sufficient force to immediately correct for the displacement of platform 14. In that event, platform 14 may move sufficiently out of position to allow some part of thrust generator 15 to contact some portion of building 10. In such a case, bumper 26, being the most-extended member of the group of parts, will be the first to contact building 10. Bumper 26 is constructed of a soft material, such as foam or rubber, so that it will not damage building 10.

By adjusting the duty cycle of motor 27, the thrust created by thrust generator 15 can be varied to accommodate different thrust requirements. Likewise, by adjusting the pitch of blades 24, trust can be controlled.

Figure 3:
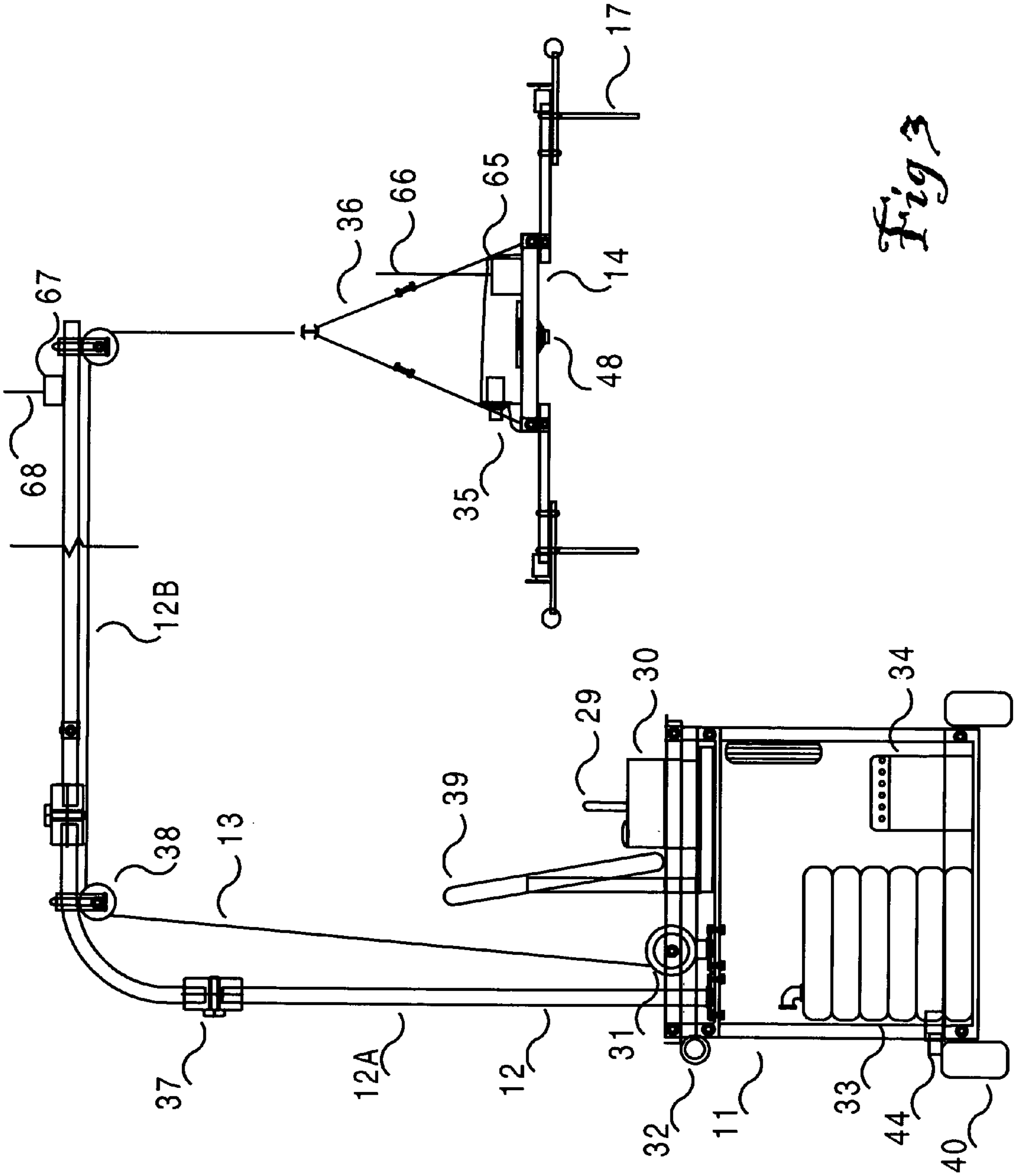
FIG. 3 is a side view of a control cart, suspension structure, cable, and platform used in the system of FIG. 1.

FIG. 3—Side View of the Control Cart, Suspension Structure, Cable and Platform The vertical stabilized inspection system of FIG. 1 generally consists of two major parts; platform 14 and cart 11.

Cart 11 is comprised of ballast 33, battery 34, support structure 12, control system 30, view screen 39, and cable control 31. Additionally, safety support tie point 32 is connected to cart 11. At each of the four corners of cart 11 is a wheel 40. Connected to one wheel 40 is a horizontal displacement sensor 44.

One end of cable 13 is connected to cable control 31, and at the other end to support wires 36. Cable 13 passes over one or more cable pulleys 38 which guide the direction of cable 13. Cable 13 also passes over linear measurement device 43. Cable control 31 comprises a motor and reel to direct the extension or retraction of cable 13 under the control of control system 30. Ballast 33 is connected to cart 11 to adjust the center of gravity of the data acquisition and spatial correlation system. By adjusting the center of gravity of the system, cart 11 can be prevented from tipping over due to an excessive load from platform 14, transferred through members 12A and 12B, or due to wind gust loads. The lower end of support wire 36 (multiple wires may be used) is connected to platform 14. Mounted on platform 14 are one or more thrust beams 16, and a data and image capture device 35.

Cart 11 holds and contains the control portions of the vertical self-stabilizing inspection system. Mounted on cart 11 is cable control 31, a motorized device to extend and retract cable 13, and a computer controller 30. Joy stick 29 provides an operator interface to control system 30 for control of cable 13. Cable 13 may consist of one or more conductive components, or one or more fiber optic components with one or more structural components.

An obstacle detection sensor 48 is connected to the underside of platform 14.

Data capture device 35 can be selected from a variety of input devices, including but not limited to video camera, still camera, digital camera, infrared camera, heat sensors, motion sensors, and color sensors.

FIG. 3—Side View of the Control Cart, Suspension Structure, Cable and Platform—Operation Cart 11 is made mobile by wheels 40. Wheels 40 are constructed so that they will not damage the roof as it is moved on building 10.

Support structure 12 provides the primary connection between cart 11 and its various components, and platform 14 and its various components. Support structure 12 must extend up, and out from cart 11 sufficiently to cause platform 14 to swing on cable 13 far enough from building 10 so as to avoid contact between any part of platform 14, thrust generators 15, and building 10. Additionally, support structure 12 must reach far enough above cart 11 as to clear any parapet that may be part of building 10. Support structure 12 must also be separable from cart 11 and sectionalized to facilitate transportation of the system.

Under control of control system 30, cable control 31 causes the extension, and retraction of platform 14 by changing the length of cable extended from cable control 31. As cable 13 extends and retracts from cable control 31, linear measurement device 43 measures the length of cable 13 either extending or retracting. These amounts are reported to control system 30 for recordation. The progress of cable 13 may be monitored on view screen 39.

Inputs to control system 30 are partially accomplished through joy stick 29. By means of joy stick 29, operator 41 (FIG. 4) can direct the lowering, or raising of platform 14. Operator 41 can also direct the operation of data and imagery capture device 35 through control system 30.

As wheels 40 roll, resulting from cart 11 being moved, displacement sensor 44 generates a signal proportional to the horizontal movement. This signal is sent to control system 30 as part of a spatial location calculation.

Connected to platform 14 is transmitter 65, connected to antenna 66. Data captured from data and imagery capture device 35 may be transmitted from platform 14 to receiver 67, and receiver antenna 68, connected to a portion of structure support arm 12B or structure support arm 12A, and on to control system 30, or to any third location for data collection.

As platform 14 is raised and lowered, it can contact a portion of building 10, the ground, or some transient obstacle. Obstacle detection sensor 48, in a preferred embodiment a sonar sensor, senses any such obstacle that the platform might contact if lowered further. It upon causes control system 30 to stop the vertical displacement of cable 13 until the obstacle can be cleared, or the system moved.

To carry data and information from cart 11 to platform 14, and from platform 14 to cart 11, including video information from platform 14 to view screen 39 on cart 11, cable 13 may consist of one or more conductive elements, including one or more structural elements, or it may consist of one or more fiber optic elements and one or more structural elements to support the fiber optic elements. Inner cable component 73 [see FIG. 11] therefore, may consist of conductive or optic elements.

Figure 4:
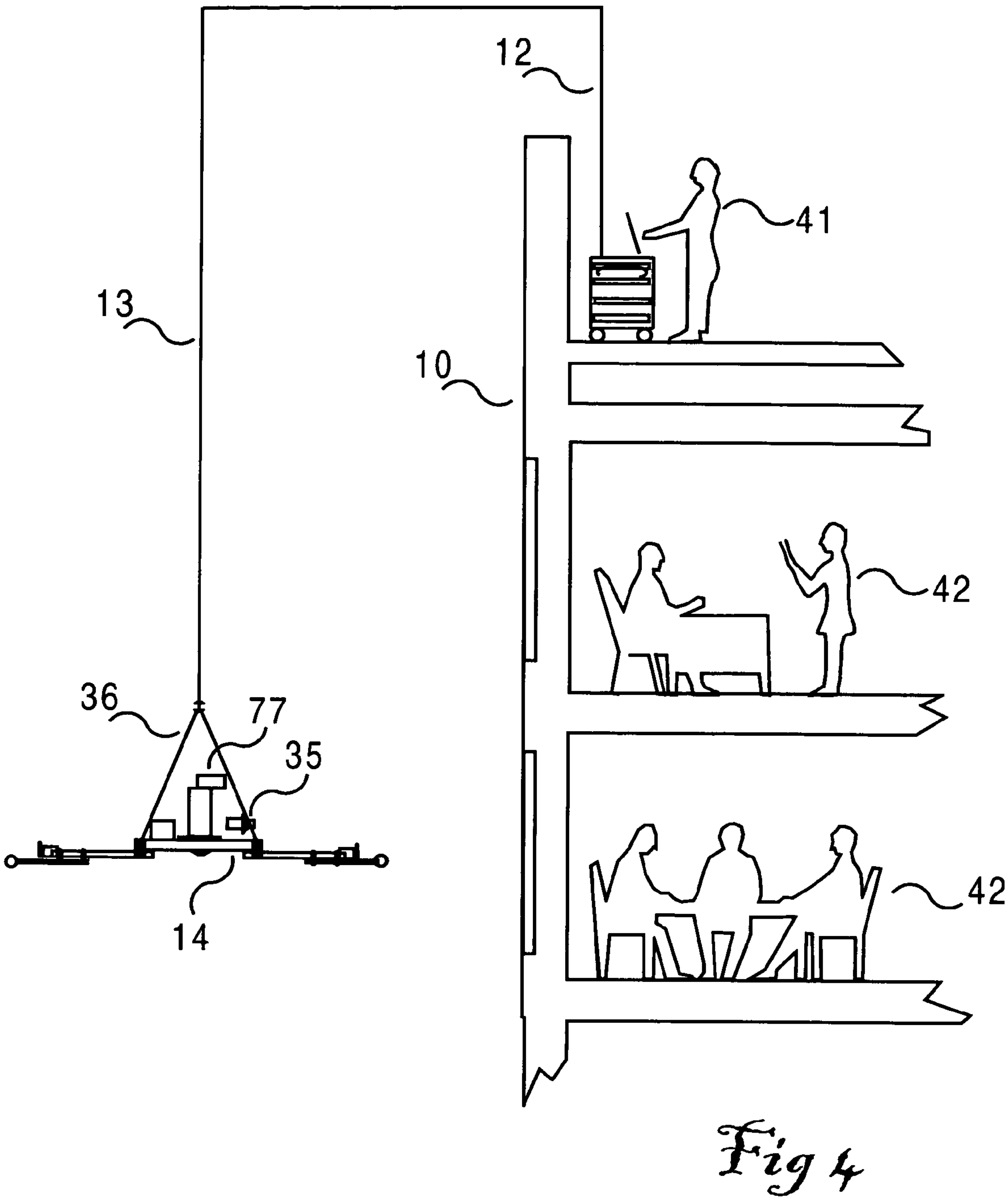
FIG. 4 is a side view of the control cart atop a building.

FIG. 4—Side View of the Control Cart Atop a Building

Building 10 comprises floors, or levels of positions where equipment and occupants 42 may work or live. Cart 11 is moveable on any flat portion of building 10, including the floors. If used on a floor of building 10, support member 12*b* may be extended through a window, door, or opening in a vertical surface. Operator 41 works in a position near cart 11. Platform 14 is suspended from cable 13. Distance measuring device 77 is connected to platform 14, and aimed at the same point as data capture device 35.

FIG. 4—Side View of the Control Cart Atop a Building—Operation

Most buildings have some reasonably flat, or horizontal area, generally the roof Cart 11 is moveable along the outer periphery of the roof by means of wheels 40. Platform 14 moves along a vertical section of building 10, without interference to any occupants 42 of building 10. Cable 13 controls the vertical position of platform 14, and the location of cart 11 controls the lateral position of platform 14. Cart 11 is positioned at one corner of building 10. Platform 14 is then lowered by cable 13, permitting data capture device 35 to capture data on a vertical portion of a wall of building 10. Cart 11 is then moved to a new position along a wall of building 10, and the procedure repeated until data on all vertical surfaces of building 10 have been captured.

Distance measuring device 77 is focused at the same point as data gathering device 35. Distance measuring device 77 measures the distance from platform 14 to the point on building 10 on which data gathering device 35 is gathering data. By measuring this distance, data gathering device can be focused and its lenses zoomed so as to gather data as if the distance between platform 14 and building 10 were always constant.

Figure 5:
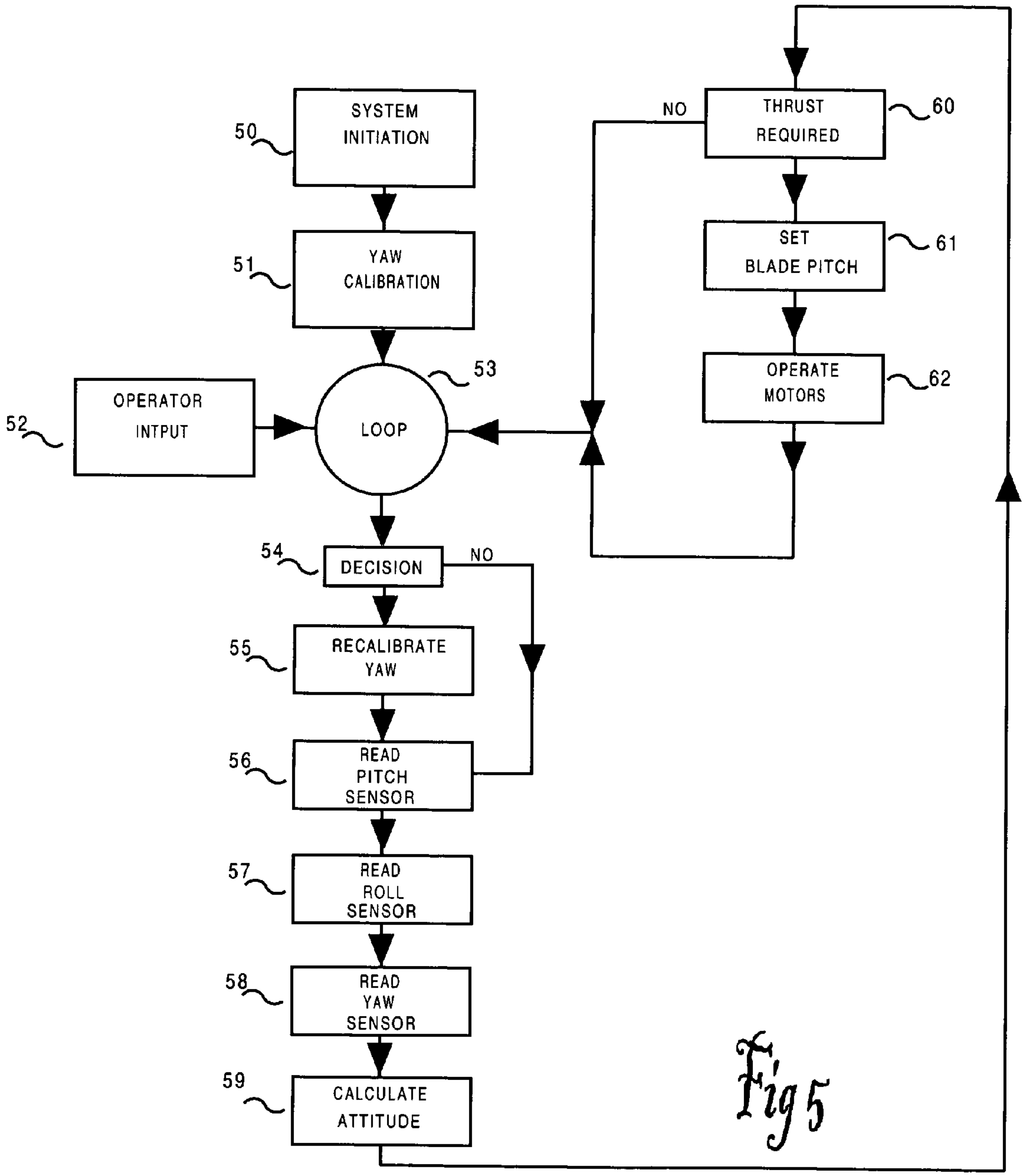
FIG. 5 is a block diagram of a control system for stabilizing the platform.

FIG. 5—Block Diagram of the System Operation

FIG. 5 is a block diagram of the software for control system (block 30). The software begins with system initiation (block 50). On power up, a microprocessor (not shown) loads the operating program and initializes its registers. After completion of the initialization process, the system enters yaw calibration (block 51). Using at least two magneto-resistive sensors (not shown), mounted at 90 degrees with respect to each other, the system rotates platform 14 about cable 13. As platform 14 rotates through preferably 720 degrees or more, numerous readings of the sensors are made. With sufficient readings, a curve of values can be correlated to magnetic heading. From this point, the heading of the platform may be determined by reading the two magneto-resistive sensors and converting the readings to a magnetic heading by use of the derived curve.

After completion of the yaw calibration (block 51), the system enters a loop (block 53). In the loop, the system looks for operator input (block 52). Operator input permits control of cable 13, and operation of data gathering device (block 35). After acceptance of any operator input, the system moves on to a decision (block 54). If the previous yaw calibration (block 51) failed to yield a curve within preset limits, the system will re-calibrate yaw (block 55). This entails the same process as yaw calibration (block 51). Upon leaving recalibrate yaw (block 55), or having skipped over it and coming directly from the decision (block 54), the system reads a pitch sensor (block 56). A pitch sensor (not shown), preferably an electrolytic tilt device, is read to establish the angle of pitch by reading pitch sensor (block 56), experienced by the platform. Likewise, with a similar sensor, the system reads a roll sensor (block 57). After establishment of a valid calibration of the magneto-resistive sensors, the system reads the yaw sensor (block 58). Having received data for three axes, the system, in calculate attitude (block 59), determines the degree of pitch, roll, and yaw of platform 14.

With its calculations compete, the system now moves to thrust (block 60). For each axis, an allowable error band, or dead band is assumed. For yaw, this dead-band is between 0.1 and 2 degrees. For pitch and roll, the allowable dead band is between 0.15 and 1 arc-second. If the calculated values for pitch, roll, or yaw are outside the pre-set dead band, it will make a thrust (block 60) to calculate the required thrust, and direction of thrust to return platform 14 to center. The acceptable dead band range of 0.15 arc second for pitch and roll calculates to a movement off-center of about 0.1 m at the end of a 60 story descent of platform 14. These dead band values are a function of the length of extended cable 13. The longer the extended portion of cable 13, the smaller must be the dead band to maintain an acceptable position of platform 14.

After determination of the amount of required thrust, and thrust direction, the system performs set blade angle-of-attack (block 61). This drives servo 19, which in turn, rotates direction converter 20, moving pitch shaft 21. The result rotates blade holder 23 to set the angle of attack of blades 24. For positions farther from the desired position, the angle of attack is set increasingly higher so as to increase thrust.

If any axis value (pitch, roll, or yaw) are out of the dead band limits, an operation motor control (block 62) provides power to motor 27. Motor 27 then drives blades 24, which will then move platform 14 back towards its desired nominal position. As with the blade pitch, the farther an axis is from the required location, the higher will be the duty cycle of the motors.

Figure 6:
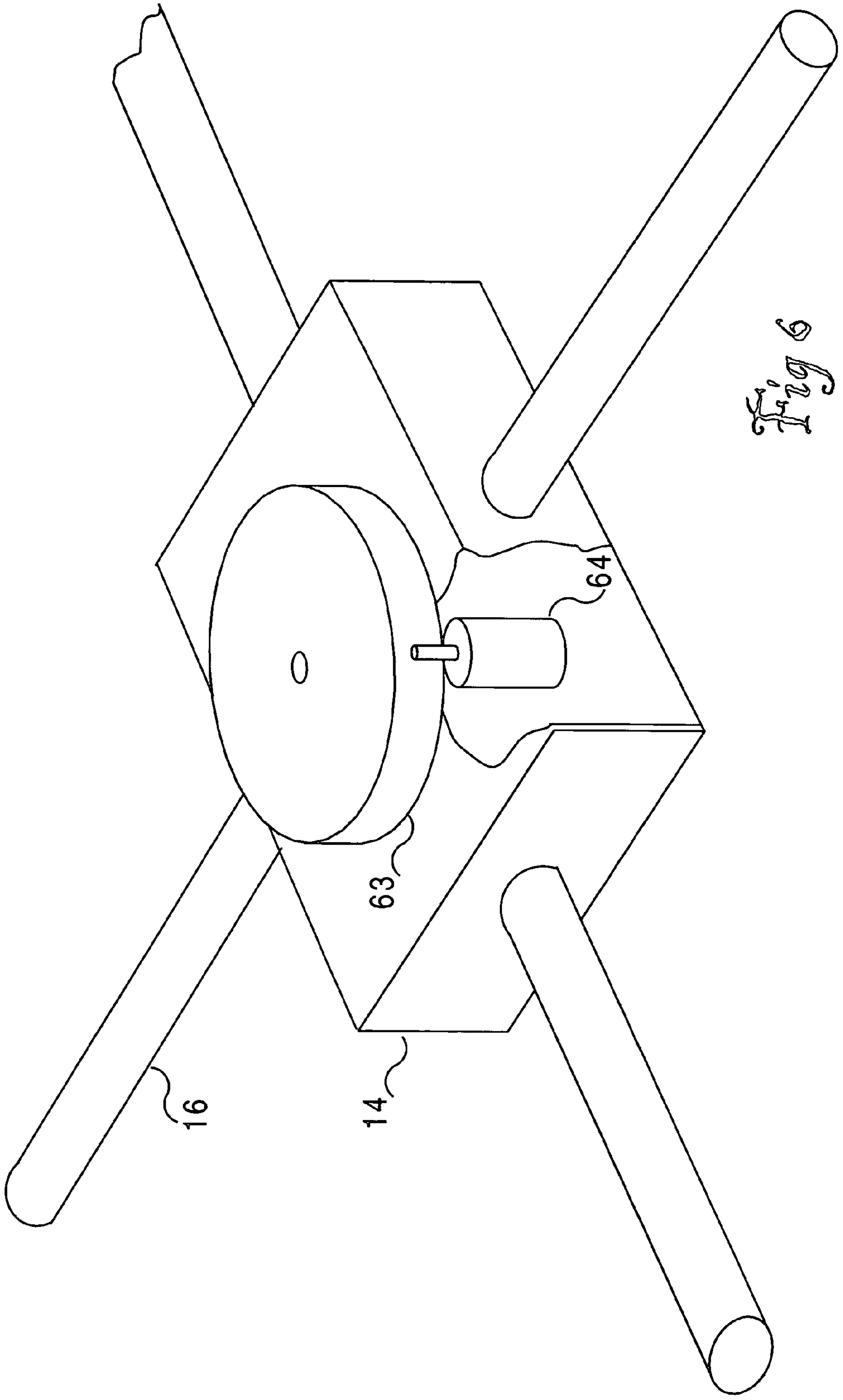
FIG. 6 is a perspective of a rotating table on the platform.

FIG. 6—Perspective View of Rotating Table

FIG. 6 generally shows a rotating table 63 attached to platform 14. A table drive motor 64 is connected to table 63.

FIG. 6—Perspective View of Rotating Table—Operation

Under high wind conditions, thrust generators 15 may be inadequate to maintain the stability of platform 14. By use of rudder 17, platform 14 may be substantially stabilized without thrust from thrust generators 15. Rudders 17 will maintain the direction of platform 14 such that rudders 17 are parallel to the direction of the wind. This direction for platform 14 may not be the desired direction for data and image capture devices 35, however. In this event, rotating table 63, driven by motor 64, may be used to realign data and image capture devices 35 to a more desirable direction, without changing the direction of platform 14.

Figure 7:
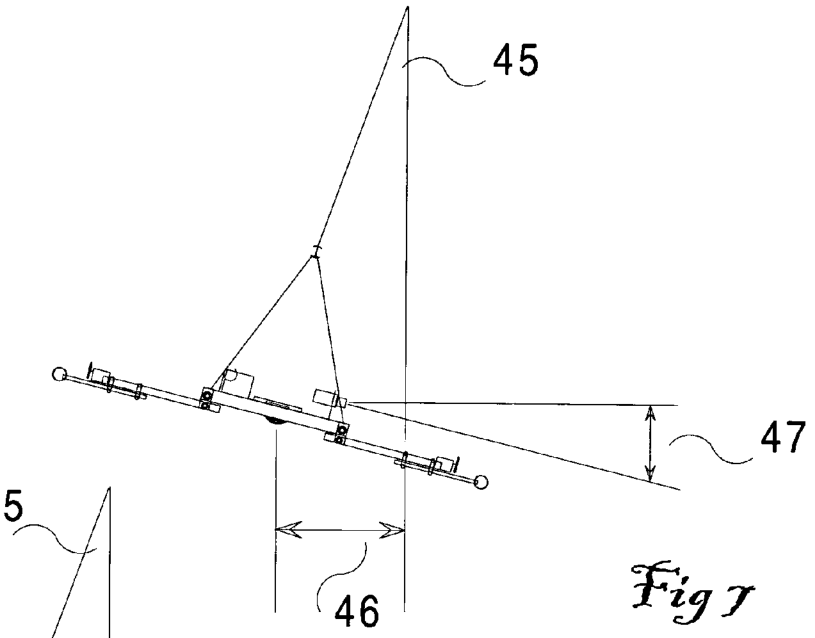
FIG. 7 is a diagram showing spatial displacement of the platform.

FIG. 7—Spatial Displacement

FIG. 7 generally shows the effects of a displacement of platform 14. This displacement may be caused by meteorological conditions, a mechanical disturbance in the system, or human intervention. Angle of rotation 45 shows the angle of cable 13 with respect to a line perpendicular to the Earth's horizon. Vertical displacement 47 is the error in vertical location, when comparing the intended viewing location of data and imagery capture device 35, and the actual location, due to angle of rotation 45. FIG. 7 was made assuming that as cable 13 rotates through angle of rotation 45, the plane of platform 14 remains perpendicular to cable 13.

Figure 8:
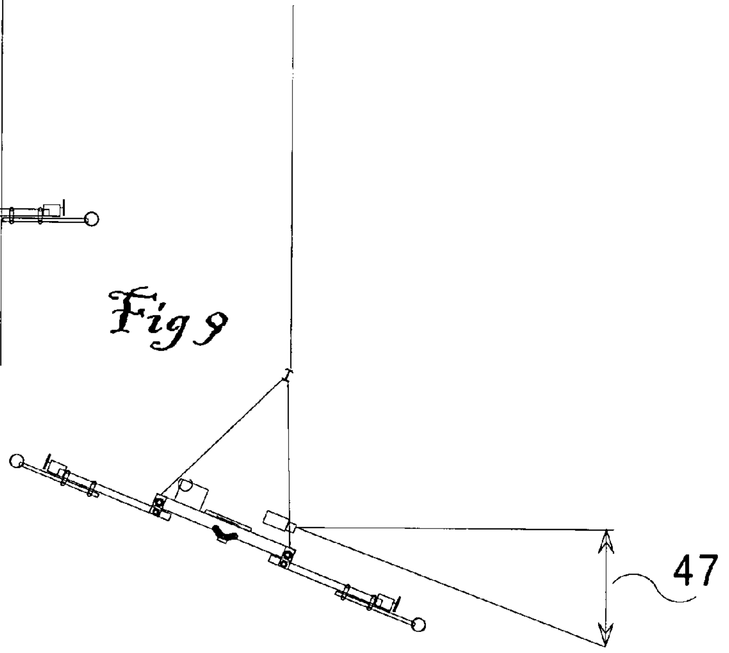
FIG. 8 is a diagram showing tilt displacement of the platform.

FIG. 8—Tilt Displacement

FIG. 8 shows the effects of vertical displacement 47, assuming cable 13 remains perpendicular to the Earth's horizon, while platform 14 rotates about cable 13 due to forces external to the system.

Figure 9:
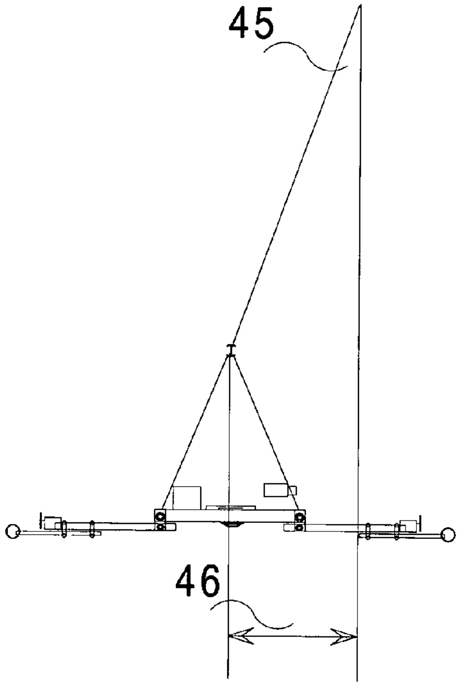
FIG. 9 is a diagram showing lateral displacement of the platform.

FIG. 9—Lateral Displacement

FIG. 9 shows horizontal displacement 46, resulting from angle of rotation 45, while platform 14 remains perpendicular to the Earth's horizon. If the platform is gyro stabilized, FIG. 9 is applicable. The gyros maintain a level platform 14, irrespective of angle of rotation 45.

Figure 10:
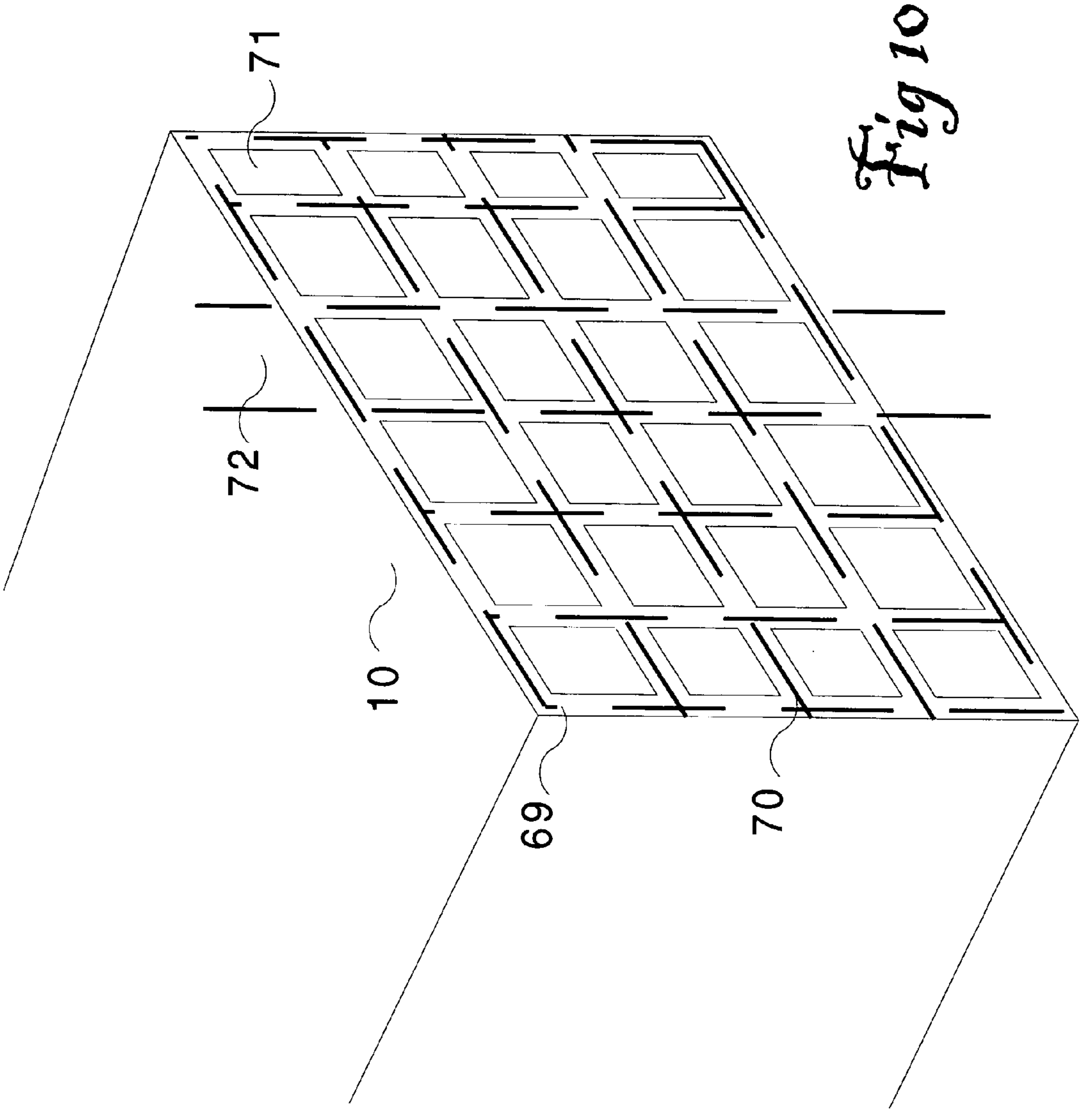
FIG. 10 is a diagram showing an image mosaic.

FIG. 10—Image Mosaic

Vertical image boundary 69 is the vertical limit of data capture device 35, taken of building 10. Horizontal image boundary is the horizontal limit of data capture device 35, taken of building 10. Image area 71 is an area bounded by two vertical image boundaries 69, and two horizontal image boundaries 70. Vertical image section 72 is a mosaic of more than one area of building 10.

Data capture device 35 is lowered along one vertical image section 72. As data capture device 35 passes into each image area 71, data is captured. Data image areas 71 are then concatenated to form one vertical image section 72. After completion of vertical section 72, cart 11 is moved to a new location, and a new series of image area 71 are captured and concatenated into a new vertical section 72.

Figure 11:
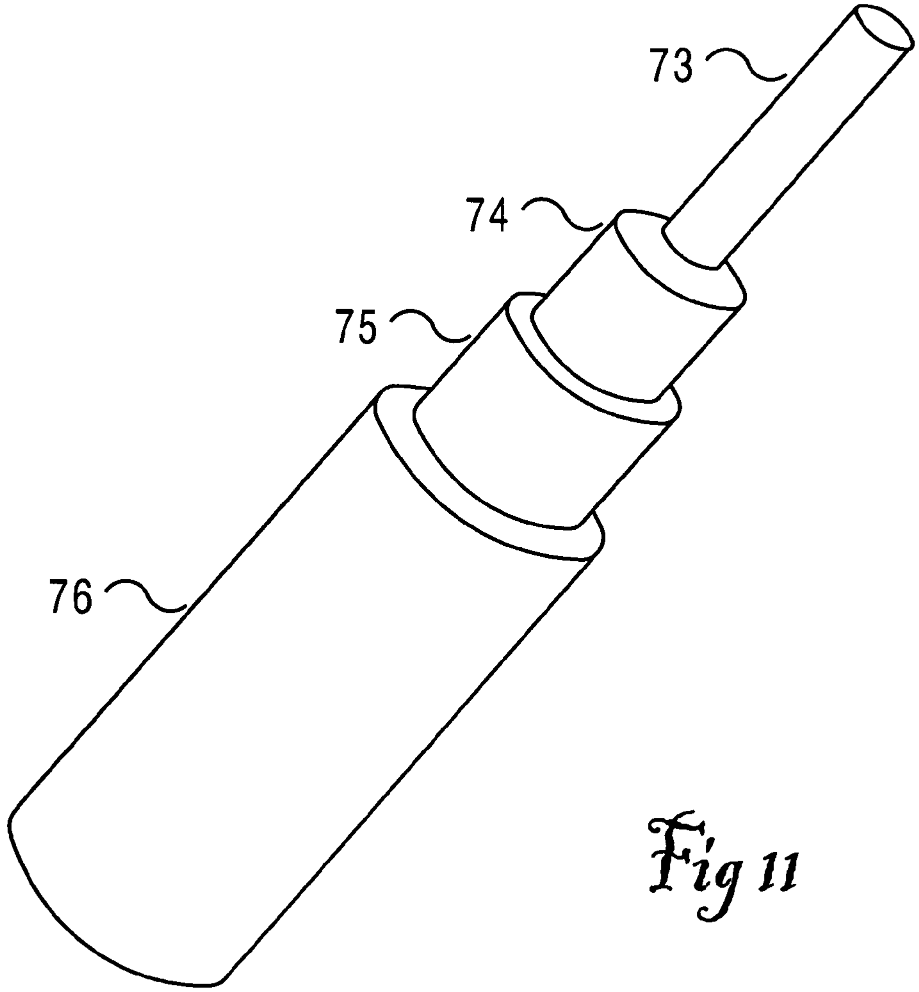
FIG. 11 is a perspective view of cable components.

FIG. 11—Cable Components

FIG. 11 generally shows the components of cable 13. Conductive inner component 73 carries the load imposed on cable 13 by platform 14 and its associated components. Inner cable component 73 also carries data from platform 14 to cart 11, and from cart 11 to platform 14. Cable insulator 74 provides electrical insulation between inner cable component 73 and outer cable component 75. Outer cable component 75 provides an electrical ground connection for data moving between cart 11 and platform 14, and further provides additional load carrying capacity. In the event of a failure of either outer cable component 73, or inner cable component 75, electrical signals between cart 11 and platform 14 are disrupted, thereby informing cart 11, and platform 14 of the failure.

Additional Features and Functions of System

The present system anticipates a need that was heretofore overlooked. Prior art required massive structures, and the risk of suspending people over the sides of buildings to gather information of the state of preservation of a building. The present system eliminates the large structures, and eliminates all of the risk of people suspended over building sides. The present system reduces the cost and risk factors associated with inspections that inspections can be used both for preventive maintenance and as a safeguard against catastrophic failures.

The present system can be readily moved from location to location on a horizontal surface, capturing video or photographic data on a vertical portion of the surface, and then moved to capture another section. The system senses the attitude, in pitch, roll, and yaw of the platform, and continuously corrects for changes in any of those axes, so that the platform presents a stable point in space from which to capture data. If the platform is moved far enough from its desired position to interrupt the successful capture of data, the system stops the cable, stops the data and imagery capture device—which might be a still camera, a video camera, an infrared camera, an ultrasonic device, or other type of surface analyzing equipment—and allows the thrust generators time to reposition the platform back on station. While the operator will be aware of a stop/start motion to the system, the actual operation of the sensors, thrust generators, and the cable control system are fully automatic, and require no input from the operator.

By presenting a stable platform from which to examine a building, structure or vessels exterior visible components, a close examination can be accomplished without constructing the type of structure necessary in window-washing type equipment, or a scaffold, or use of mobile derricks or cranes.

With conventional equipment, it would be tedious at best to create an accurate, section by section record of the condition of exterior visible components. Workers, operating from conventional equipment would have a difficult time of not only recording surface conditions, but tracking the exact location of each photograph or video frame. The present system allows for not only the recordation of data, but also the exact location—both vertical and horizontal—which that data represents. Additionally, the present system allows data recorded to be tiled, so that a mosaic of an entire wall may be created from a series a recordings.

Through remote real time video observation or archived data, inspectors, engineers, architects, or other authorized individual person can examine the data, and see the exact location of any recorded condition, from any selected on or off site location. This review may be of an entire area, or selected areas. Any observed conditions warranting action can be pinpointed for a cost effective approach to applicable actions. This would include but not limited to remedial repair, legal negotiations, maintenance and insurance.

To provide useful data on a large surface, such as the vertical side of a building, it is a practical necessity the data is gathered on small portions of the surface, then the data so gathered combined into a mosaic to represent the complete surface. The present system provides for such data gathering, and additionally, the measurement of the actual distance from the data gathering device to the surface under scrutiny. By measuring this distance, the focal point, and zoom factor of the data device can be adjusted so the resulting data, when combined into a mosaic, will appear to have been taken from exactly the same distance everywhere on the vertical surface.

Many large buildings and structures have microwave antennas, broadcast antennas, and other devices emitting electromagnetic wave energy. Under these circumstances, it might be difficult, or impossible to transfer by radio transmission methods data from the platform to the cart. The present system provides a cable containing at least two conductive elements to provide a path for the transmission of data and video within the cable, thereby minimizing or eliminating the potential interference of local electro magnetic wave devices.

Additionally, by using a two conductor cable, other advantages will be seen. In the event of a breakage of one of the conductors, due to stress or excessive strain of the cable, data transfer will immediately be interrupted. This interruption will be interpreted by both the cart and platform as a failure, and immediate emergency safety steps can be undertaken. As an additional feature, a two conductor cable offered the safety of having a second load bearing member able to carry load in the event of a conductor failure. This would prevent a catastrophic loss of control of the platform.

The best possible inspection of a vertical surface requires a "head-on" view of the surface, from a very short distance. Previously, this required suspending equipment and people over the side of the building—often at considerable peril to the people. A sudden gust of wind, or a frayed cable could, and often in the past has resulted in death and injury. The present system provides the close up view, with direct correlation of the view with the precise location on the surface, with a minimal amount of equipment suspended over the side of a building, and no people in a place of danger. Further, by keeping equipment to a minimum, the danger to people and property below the inspection is greatly minimized.

The use of infrared video and camera equipment provides a thermal inspection that can not only detect structural defects, but can provide extremely valuable energy conservation data. Energy leakage points can be detected, and precisely pinpointed with the present system.

By detecting out of tolerance positional conditions, data gathering can be stopped, preventing wasted or useless information from being gathered and stored.

Restoring the platform to a desired position, with resumption of data gathering upon reaching the desired location, results in a system that requires a minimum of operator training and experience.

After a meteorological event such as a hurricane or tornado, component damage may be suspected Use of the present system keeps both observers and inspectors out of harm's way during an inspection for component damage.

It is possible that a sudden gust of wind can momentarily move the platform out of position, possibly to the point of causing contact between the system and the building, structure or vessel. By using soft bumpers at the extremities of the thrust generators, any contact will be non destructive to both the system and building, structure or vessel components.

The construction of scaffolding, or setup of window-washing type platforms requires considerable effort, expense and time. Any such construction falls under federal law [OSHA], and local building and safety rules and ordnances. The present system, involving a very small apparatus hanging over the side of the building, not only is exempt from most, if not all, federal and local law, rules and ordnances, it eliminates the costly and time-consuming efforts involved An inspection can be completed in days, instead of weeks or months.

The present system provides a precise correlation between a view of a section of a building wall, and the actual section being viewed. Heretofore, guesswork was employed to approximate the correlation between a picture of a wall section, and the wall section itself. The present system provides a horizontal movement sensor, and a vertical [cable] sensor. By recording where, on a roof or flat surface, the inspection begins, precise XY coordinates for each picture or data group is acquired along with the data itself. After completion of the inspection, a tiled composite picture of a complete wall can be made, overlayed with an XY grid. Any problems detected will be accompanied with the precise location of the problem.

CONCLUSIONS, RAMIFICATIONS, AND SCOPE

Accordingly, it can be seen that the various embodiments set forth provide an apparatus that affords a means and method for the close inspection of the vertically exposed components of buildings, structures, and vessels. By sensing spatial position and attitude, and correcting to a desired location, a platform is provided for a camera, video system, or other sensing and recording device to record the appearance, mechanical, and structural status of vertically exposed components as if a person were in close proximity, without the risk of having a person actually there.

The present system corrects the long-standing lack of consideration for possible failure modes due to component failure, or system failure. By providing numerous checks and interlocks within the system, only when the recording device is in a correct position, valid data is acquired and recorded. By eliminating the presence of living persons, the need for relatively massive structures is also eliminated. The too-often proven risk of having people and structures hanging off the side of a building, structure or vessel is drastically reduced.

By utilizing a remote operator for the system, safe from any concern for their own safety, the operator can concentrate on better obtaining the data needed, resulting in a better result, at lower cost, and greatly reduced risk of catastrophe.

A complete picture of a surface is obtained by positioning the cart portion of the system at one point, completing a "drop" by lowering the platform from its starting point to the lowest point possible without impacting an obstruction, horizontal surface or the ground, then retracting the platform to its starting point. The cart is then moved to a new location, and the process repeated.

The applications and advantages of this system are significant. The world, in recent years, has seen an increase in meteorological events, such as coastal erosion, tornados and hurricanes that not only can, but have, caused massive destruction of property as well as ecological disasters. These types of events cause not only obvious damage, but create latent defects that can cause serious destruction weeks, months, and years later. Additionally, terrorist attacks have been generally targeted at larger buildings, yet applicable to structures and vessels. These attacks can also create latent defects. By making systematic and detailed inspections of building, structure or vessel exteriors inexpensive, and relatively risk free, the detection of these latent defects can be found before a catastrophic event.

By inspecting a building, structure or vessel prior to sale, or the binding of a new insurance policy, the risk to all parties is lessened. By archiving inspection reports for a building, structure or vessel, liability for existing conditions can be properly assigned. The true state of a building, structure or vessel will be better known to both buyer and seller.

While the above description contains many specificities, the ramifications of the system are many and diverse.

The scope of this system encompasses a means and method of capturing and recording data relating to close inspection of the vertical plane of a building, structure, or vessel, while correlating that data to specific locations on the vertical plane, and with reduced or no risks associated with suspending people or heavy equipment over the sides of the building, structure or vessel.

A close inspection might consist of workers walking on scaffolding, or carried to proximity with the vertical wall by crane. The workers might simply look at the adjacent structure, or possibly take pictures. With no reasonable means of determining exact position, there was no way to correlate the position of the workers, or the pictures taken with a precise location on the subject wall. The result has been, if any serious anomalies were detected, to scaffold and repair significant portions of a wall, instead of just specific places on the wall.

Accordingly, the scope of this invention should be defined by the scope of the following claims and their legal equivalents, and not by the specific embodiments described.

The invention claimed is:

1. A building, vessel, and structure inspection system, utilizing data acquisition and spatial correlation, comprising:

(a) a platform suspended in a vertical axis by a cable;

(b) a data gathering means;

(c) a sensor means for determining spatial orientation of said platform and providing an output indicative of said spatial orientation;

(d) a control system means for receiving said output from said sensor means and correlating data from said data gathering means and spatial orientation; and (e) a plurality of thrust means for repositioning said platform by applying thrust in a desired direction.

2. The building, vessel, and structure inspection system, utilizing data acquisition and spatial correlation of claim 1, further including a means for raising and lowering said platform.

3. The building, vessel, and structure inspection system, utilizing data acquisition and spatial correlation of claim 2, further including a means to stop movement of said means for raising and lowering said data acquisition and spatial correlation system when said data acquisition and spatial correlation system is in a predetermined position.

4. The building, vessel, and structure inspection system, utilizing data acquisition and spatial correlation of claim 1, further including a plurality of thrust means for repositioning said platform by applying thrust in a desired direction.

5. The building, vessel and structure inspection system, utilizing data acquisition correlation of claim 1, further including a plurality of thrust direction control means for directing said desired direction of said plurality of said thrust means for repositioning said platform.

6. The building, vessel, and structure inspection system, utilizing data acquisition and spatial correlation of claim 1, further including a means for energizing and de-energizing said plurality of thrust means.

7. The building, vessel, and structure inspection system, utilizing data acquisition and spatial correlation of claim 1, wherein said control system includes a means for adjusting the ratio of energized to the ratio of energized to de-energized time of said thrust means.

8. The building, vessel, and structure inspection system, utilizing data acquisition and spatial correlation of claim 1, wherein said control system is in communication with said sensor means said plurality of thrust direction control means, and said plurality of thrust means to direct said plurality of thrust direction control means and said plurality of thrust means for repositioning of said platform to a desired location.

9. The building, vessel, and structure inspection system, utilizing data acquisition and spatial correlation of claim 1, wherein said control system includes a means for controlling the output of said plurality of thrust means.

10. The building, vessel, and structure inspection system, utilizing data acquisition and spatial correlation of claim 1 wherein said sensor means for determining spatial orientation includes a means for measuring pitch attitude of said platform.

11. The building, vessel, and structure inspection system, utilizing data acquisition and spatial correlation of claim 1 wherein said sensor means for determining spatial orientation includes a means for measuring roll attitude of said platform.

12. The building, vessel, and structure inspection system, utilizing data acquisition and spatial correlation of claim 1 wherein said sensor means for determining spatial orientation includes a means for measuring yaw attitude of said platform.

13. The building, vessel, and structure inspection system, utilizing data acquisition and spatial correlation of claim 1, further including a means for moving the vertical centerline of said platform.

14. The building, vessel, and structure inspection system, utilizing data acquisition and spatial correlation of claim 13, further including a means to adjust the center of gravity of said means to move said vertical centerline of said data acquisition and spatial correlation system.

15. The building, vessel, and structure inspection system, utilizing data acquisition and spatial correlation of claim 1 wherein said data gathering means is selected from the group consisting of video, still photography, digital photography, infrared photography, heat sensors, motion sensors, and color sensors.

16. The building, vessel, and structure inspection system, utilizing data acquisition and spatial correlation of claim 1, further including a means for sensing possible contact of said data acquisition and spatial correlation system with an obstruction by sensing said obstruction prior to contact.

17. The building, vessel, and structure inspection system, utilizing data acquisition and spatial correlation of claim 16, further including a means for stopping movement of said means for raising and lowering said data acquisition and spatial correlation system if said means for sensing contact of data acquisition and spatial correlation system indicates a contact.

18. The building, vessel, and structure inspection system, utilizing data acquisition and spatial correlation of claim 1, further including a means for stopping capture of said capture of data and images if said data acquisition and spatial correlation system is not in a predetermined position.

19. The building, vessel, and structure inspection system, utilizing data acquisition and spatial correlation of claim 1, further including a computer means for monitoring spatial position of said data acquisition and spatial correlation system.

20. The building, vessel, and structure inspection system, utilizing data acquisition and spatial correlation of claim 1, further including a means for rotating the direction of said data acquisition and spatial correlation system.

21. The building, vessel, and structure inspection system, utilizing data acquisition and spatial correlation of claim 1, further including a means for preventing damage to said building, structure or vessel on contact of parts of data acquisition and spatial correlation system with said building, structure, or vessel.

22. The building, vessel, and structure inspection system, utilizing data acquisition and spatial correlation of claim 1, further including a means for communicating with a remote data receiver.

23. The building, vessel, and structure inspection system, utilizing data acquisition and spatial correlation of claim 22, further including a means for transmitting data and images from said means for capturing data and imagery to a remote location.

24. A method of inspecting the exteriors of buildings, structures, and vessels, comprising:

(a) suspending a data-capturing platform with a cable;

(b) sensing attitude and position of said data-gathering platform;

(c) capturing data with said data-gathering platform;

(d) correlating said attitude and position of said data gathering platform with said data acquired; and (e) a plurality of thrust generators for changing the position of said data-gathering platform.

25. The method of claim 24, further including a plurality of thrust generators for changing the position of said data-gathering platform.

26. The method of claim 24, further including drive circuitry for turning on and off said thrust generators.

27. The method of inspecting the exteriors of buildings, structures, and vessels of claim 26, further providing a plurality of pitch axis sensors for determining the direction for repositioning said data-gathering platform in pitch axis.

28. The method of inspecting the exteriors of buildings, structures, and vessels of claim 26, further providing a plurality of yaw axis sensors for determining the direction for repositioning said data-gathering platform in yaw axis.

29. The method of inspecting the exteriors of buildings, structures, and vessels of claim 26, further including a plurality of roll axis sensors for determining the direction for repositioning said data-gathering platform in roll axis.

30. The method of inspecting the exteriors of buildings, structures, and vessels of claim 24, further including a calculation of said attitude and position from said plurality of yaw sensors, said plurality of roll sensors and said plurality of pitch sensors.

31. The method of inspecting the exteriors of buildings, structures, and vessels of claim 24, further providing a rudder for aligning said platform in the direction of prevailing wind.

32. The method of inspecting the exteriors of buildings, structures, and vessels of claim 24, further providing a rotating table mounted on said platform.

33. An apparatus for inspecting buildings, structures, and vessels, including;

(a) a platform;

(b) a data gathering device supported on said platform;

(c) a cable providing vertical support for said platform;

(d) a plurality of thrust generators for moving said platform;

(e) a plurality of sensors on said platform to sense attitude; and (f) a computer to calculate position and attitude of said platform.

34. The apparatus claim 33, further including a power source for powering said thrust generators.

35. The apparatus of claim 33, wherein said data gathering device is selected from the group consisting of video, still photography, digital photography, infrared photography, heat sensors, motion sensors, and color sensors.

36. The apparatus of claim 33 wherein said cable vertically positions said platform.

37. The apparatus of claim 33 wherein said sensors are arranged to output attitude data to said computer.

38. The apparatus of claim 37 wherein said computer is arranged to calculate position from said attitude data and correlates said position from output from said data gathering device.

39. The apparatus of claim 33 wherein said cable contains a combination of elements selected from the group consisting of structural elements, electrically conductive elements, and fiber optical elements.

* * * * *